(12) United States Patent
Shotey et al.

(10) Patent No.: US 8,671,702 B1
(45) Date of Patent: Mar. 18, 2014

(54) RECESSED THERMOSTAT AND CUTTING TOOL

(75) Inventors: Marcus J. Shotey, Scottsdale, AZ (US);
Jeffrey P. Baldwin, Phoenix, AZ (US);
Kenneth C. Booth, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 603 days.

(21) Appl. No.: 12/561,203

(22) Filed: Sep. 16, 2009

Related U.S. Application Data (60) Provisional application No. 61/097,499, filed on Sep. 16, 2008.

(51) Int. Cl.
*B23P 11/00* (2006.01)

(52) U.S. Cl.
USPC ............. 62/129; 29/525.01; 29/592; 236/9 A; 236/1 C; 236/91 R; 236/91 E; 236/91 F; 345/684; 700/299

(58) Field of Classification Search
USPC ...... 29/525.01, 428, 592; 236/9 A, 1 C, 91 R, 236/91 E, 91 F; 345/684; 700/299; 62/129
See application file for complete search history.

(56) References Cited

U.S. PATENT DOCUMENTS

| | | | | |
|---|---|---|---|---|
| 2,827,534 A * | 3/1958 | Grayson | ...................... | 337/323 |
| 6,019,630 A * | 2/2000 | Alpert | ........................... | 439/501 |
| 6,893,194 B2 * | 5/2005 | Jones et al. | ................... | 408/204 |
| 7,578,135 B2 * | 8/2009 | Mattheis | ........................ | 62/129 |
| 7,667,136 B2 * | 2/2010 | Dinh et al. | ....................... | 174/58 |
| 8,089,032 B2 * | 1/2012 | Beland et al. | ................. | 219/492 |

* cited by examiner

*Primary Examiner* — Peter DungBa Vo
*Assistant Examiner* — Azm Parvez
(74) *Attorney, Agent, or Firm* — Marcus R. Mickney; Mark S. Bicks; Alfred N. Goodman (57) ABSTRACT

In an aspect, a recessed thermostat assembly includes a thermostat housing having a face plate and one or more side walls at least partially enclosing one or more thermostat components. The face plate is wider than the side walls. A moveable brace is responsive to and operatively associated with a brace actuator such that movement of the brace actuator in a first direction responsively causes the moveable brace to move toward the face plate, and movement of the brace actuator in a second direction responsively causes the moveable brace to move away from the face plate. The brace actuator accessible through the face plate. The movable brace is configured to impinge a building wall structure between the movable brace and a rear surface of the face plate when the moveable brace is moved toward the face plate.

17 Claims, 5 Drawing Sheets

RECESSED THERMOSTAT AND CUTTING TOOL

CROSS REFERENCE TO RELATED APPLICATIONS

This Application claims the benefit of the filing date of U.S. Provisional Patent Application 61/097,499 to Shotey, et al., entitled "Recessed Thermostat and Cutting Tool," which was filed on Sep. 16, 2008, the disclosure of m which is hereby incorporated herein by reference.

BACKGROUND

1. Technical Field

Aspects of the present document relate generally to recessed thermostats and cutting tools configured for the installation thereof.

2. Background Art

Thermostats are known in the art. Conventional thermostats are mounted on the surface of a wall, or other building structure, with the implementing electronics, controls, temperature gauges, and other implementing components, typically located in a housing located substantially on the outside of a front surface of the wall or other building structure.

SUMMARY

Aspects of this document relate to recessed thermostats.

In one aspect, a recessed thermostat assembly comprises a thermostat having a thermostat housing including a face plate and one or more side walls, with the face plate being wider than the side walls. The one or more side walls at least partially enclose one or more thermostat components. A moveable brace is responsive to and operatively associated with a brace actuator, such that movement of the brace actuator in a first direction responsively causes the moveable brace to move toward the face plate, and movement of the brace actuator in a second direction responsively causes the moveable brace to move away from the face plate. The brace actuator is accessible through the face plate the moveable brace. The movable brace is configured to impinge a building wall structure between the movable brace and a rear surface of the face plate when the moveable brace is moved toward the face plate.

Particular implementations may include one or more of the following. The face plate may include one or more temperature sensors. After the moveable brace is moved to impinge the building wall structure, the face plate may be configured to extend less than 1.5 centimeters from a front surface of the building wall structure. The face plate may include a thermostat display. The brace actuator may be configured for rotational movement to move the moveable brace linearly toward the face plate. The brace actuator may be configured for linear movement to move the moveable brace linearly toward the face plate. A removable cover may be provided, the cover configured to couple to a front surface of the face plate to cover an opening where the brace actuator is accessible through the face plate. The brace actuator may comprise a screw. The brace actuator may comprise a pull cord having a serrated edge configured to engage a corresponding one-way locking feature coupled to the housing. A cutting tool may be included for cutting an opening in the building wall structure, with the opening sized to receive the one or more side walls but not the face plate, the cutting tool. The cutting tool may include a manual gripping handle coupled across a diameter of a cylindrically arranged plurality of cutting blades. The cutting tool may also include a shaft extending along a center axis of the cylindrically arranged plurality of cutting blades, from within the plurality of cutting blades, to a point beyond a front plane of the plurality of cutting blades. The plurality of cutting blades may be configured to cut a mounting hole in a wall structure when the one or more cutting blades are engaged with the wall structure and a manual rotational force is applied in the direction of the cutting blades and the wall structure.

In another aspect, a cutting tool assembly includes a plurality of cutting blades arranged at an end of a cylindrical body having a diameter and a center axis of rotation. The plurality of cutting blades are arranged around an outside perimeter of the cylindrical body and face in a direction perpendicular to the axis of rotation. The cutting blades form a front plane for the cylindrical body perpendicular to the axis of rotation. A manual gripping handle is coupled across the diameter of the cylindrical body. A shaft is coupled to the cylindrical body and extends along the center axis of rotation from within the cylindrical body to a point beyond the front plane for the cylindrical body. The plurality of cutting blades are configured to cut a mounting hole in a wall structure when the one or more cutting blades are engaged with the wall structure and a manual rotational force is applied about the axis of rotation, and a manual linear force is applied to press the cutting blades against the wall structure.

Particular implementations may include one or more of the following. A guide may be slidably mounted around the shaft. The guide may include a plurality of cylindrical tiers each having a different diameter progressing from a smallest diameter on a first tier closest a distal end of the shaft to a largest diameter on a last tier farthest from the distal end of the shaft. The guide may be sized for positioning within an existing hole in the wall structure at a center of the plurality of cutting blades. A distal end of the shaft may include a guide having a plurality of cylindrical tiers each having a different diameter, progressing from a smallest diameter on a first tier closest a distal end of the shaft, to a largest diameter on a last tier farthest from the distal end of the shaft, the guide sized for positioning within an existing hole in the wall structure at a center of the plurality of cutting blades. The shaft may be slidably coupled to the cylindrical body. The guide further may include a wire opening adjacent to the shaft, and the opening may be sized to receive wires therethrough, and to retain those wires while the mounting hole is cut in the wall structure. The shaft may be at least partially hollow along its center axis and the hollow may be sized to receive wires therethrough and retain those wires while the mounting hole is cut in the wall structure.

In still another aspect, a method of installing a recessed thermostat assembly in a wall structure includes placing a thermostat assembly having a face plate and at least one side wall extending behind the face plate at an installed position with respect to a mounting hole in a wall structure. The installed position includes where the face plate is against a first side of the wall structure, and the at least one side wall extends into the wall structure. A brace actuator is actuated to move a moveable brace into an engaged position with respect to the wall structure. At least a portion of the wall structure is impinged between the movable brace and a rear surface of the face plate. The thermostat assembly is coupled to the wall structure by locking the moveable brace in place against the wall structure after the wall structure is impinged.

Particular implementations may include one or more of the following. The mounting hole in the wall structure may be cut prior to placing the thermostat assembly in the mounting hole. Cutting the mounting hole may include threading thermostat wires extending from a wire hole in the wall structure into a cutting tool, and placing a cutting tool guide in the wire hole around the thermostat wires. Cutting the mounting hole may further include engaging a front surface of the wall structure with a cutting tool assembly having a plurality of cutting blades arranged in a circle around the cutting tool guide with the cutting tool guide at the center of the circle, and manually rotating the cutting tool assembly about the center of the circle and manually applying pressure against a handle of the cutting tool to cut through a surface of the wall structure. Cutting the mounting hole through the wall structure with the cutting tool may be accomplished by continuing manual rotation and pressure. Threading the thermostat wires into the cutting tool may include threading the thermostat wires through the guide. In addition, placing the cutting tool guide in the wire hole around the thermostat wires may further include positioning the guide within the hole with the thermostat wires extending through the guide. The guide may include a plurality of cylindrical tiers of different diameters and the guide may be inserted into the wire hole so that a tier having a diameter closest to but less than a diameter of the hole is positioned within the wire hole.

The foregoing and other aspects, features, and advantages will be apparent to those having ordinary skill in the art from the DESCRIPTION and DRAWINGS, and from the CLAIMS.

BRIEF DESCRIPTION OF THE DRAWINGS

A recessed thermostat and cutting tool will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and/or installation of a recessed thermostat assembly and/or assembly procedures for a recessed thermostat and cutting tool will become apparent from this disclosure. Accordingly, for example, although particular recessed thermostat assemblies, thermostats, thermostat bodies, face plates, side walls, thermostat components, moveable braces, brace actuators, temperature sensors, thermostat displays, removable covers, openings, screws, pull cords, serrated edges, cutting tools, manual gripping handles, cutting blades, cylinders, shafts, center axes, front planes, mounting holes, cylindrical bodies, diameters, guides, cylindrical tiers, wire openings, wires, and other components are disclosed, such thermostats, thermostat bodies, face plates, side walls, thermostat components, moveable braces, brace actuators, temperature sensors, thermostat displays, removable covers, openings, screws, pull cords, serrated edges, cutting tools, manual gripping handles, cutting blades, cylinders, shafts, center axes, front planes, mounting holes, cylindrical bodies, diameters, guides, cylindrical tiers, wire openings, wires, and implementing components, may comprise any shape, size, style, type, model, version, measurement, concentration, material, quantity, and/or the like as is known in the art for such recessed thermostat and cutting tools, consistent with the intended operation of a recessed thermostat and cutting tool.

There are a variety of recessed thermostat and cutting tool implementations disclosed herein. FIGS. 1-5 illustrate various particular implementations of a recessed thermostat assembly, with the associated description explaining these, and other, particular implementations. In particular, a recessed thermostat assembly 1 includes thermostat components 2, such as a display, controls and one or more temperature sensors (sometimes in combination referred to as "thermostat 2"), which are used to receive one or more input signals relative to one or more temperatures of one or more environments, and to transmit one or more control signals to one or more heating or cooling units associated with the thermostat components based on the one or more input signals and based on a pre-determined set-point. Thermostat components generally are well known in the art. The one or more temperature sensors may include any internal or external temperature sensor known in the art (such as, by way of non-limiting example, any bimetallic, mechanical and/or electrical temperature sensor). In some particular implementations, a face plate 6 may include a wireless receiver configured to receive and/or transmit one or more signals from and/or to one or more externally located temperature sensors and/or one or more heating or cooling units.

Figure 1:
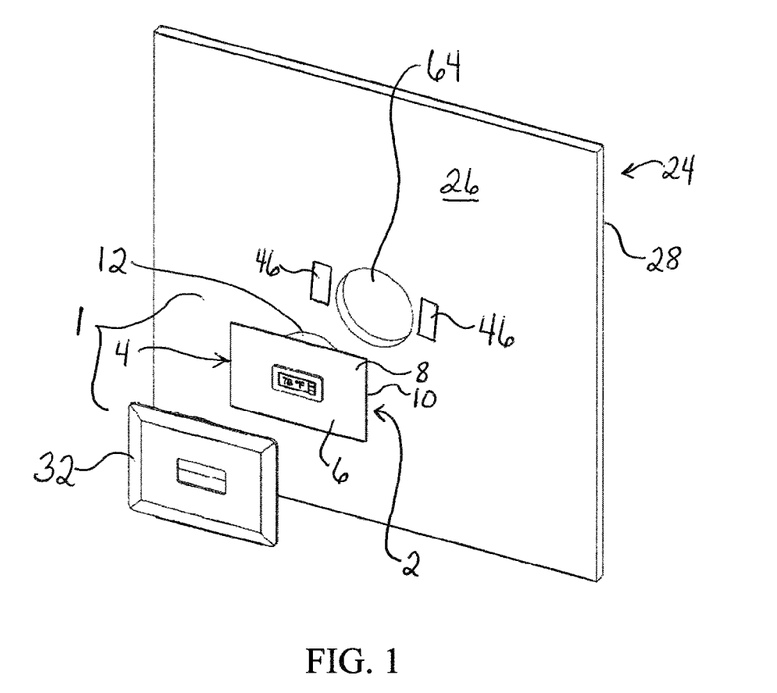
FIG. 1 illustrates an exploded perspective view of a particular implementation of a recessed thermostat assembly.
Figure 2:
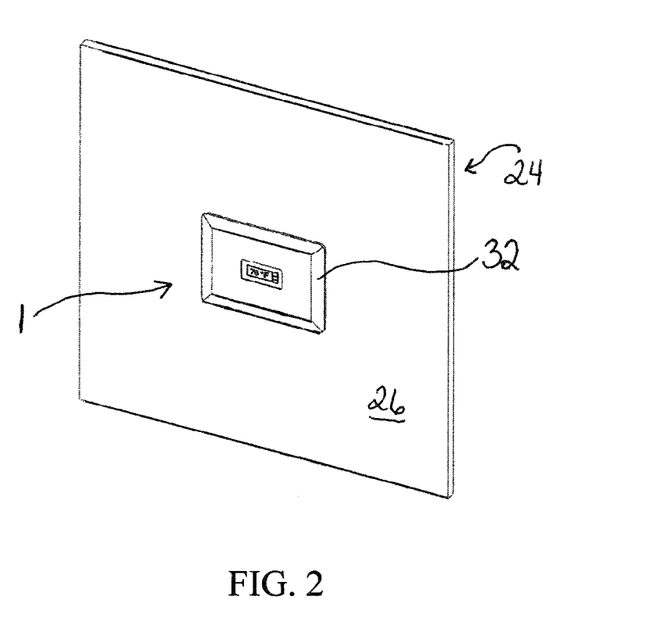
FIG. 2 illustrates an installed perspective view of a particular implementation of a recessed thermostat assembly.

The thermostat 2 of the particular implementations illustrated in FIGS. 1-5 include a thermostat housing 4 having a face plate 6 (which includes a front surface 8 and a rear surface 10) and one or more side walls 12. The one or more side walls 12 at least partially enclose the thermostat components that are conventionally used for the implementation of electromechanical and/or electronic thermostats. Significantly, as illustrated by FIG. 1, the face plate 6 is wider than the one or more side walls 12, to resist the thermostat 2 from falling through one or more mounting holes 64 when the thermostat 2 is moved to an installed position (FIG. 2). For the specific implementation shown in FIGS. 1-2, an adhesive pad 46 is placed between the rear surface 10 of the face plate 6 and the front surface 26 of the wall 24 to hold the thermostat 2 in place when it is mounted within the mounting hole 64. In particular implementations, the back side of the housing 4 extends through the back surface 28 of the wall 24. Although double-sided adhesive pads 46 work well to hold the thermostat 2 in place, any method known to hole a plate to a wall may be used. The thermostat assembly 1 further comprises a cover plate 32 configured for placement over the front surface 8 of the face plate 6 to provide a finished look for the thermostat assembly 1. The cover plate 32 may be configured to snap- or friction-fit over the face plate 6, or may be coupled to the face plate 6 with adhesive pads or other method of coupling the cover plate 32 to the face plate 6.

Figure 3:
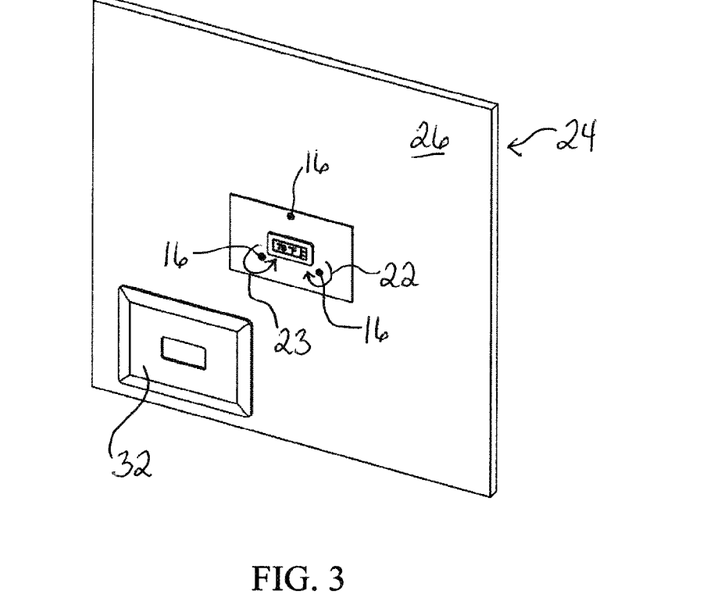
FIG. 3 illustrates a perspective view of a particular implementation of a recessed thermostat assembly with brace screws.
Figure 4:
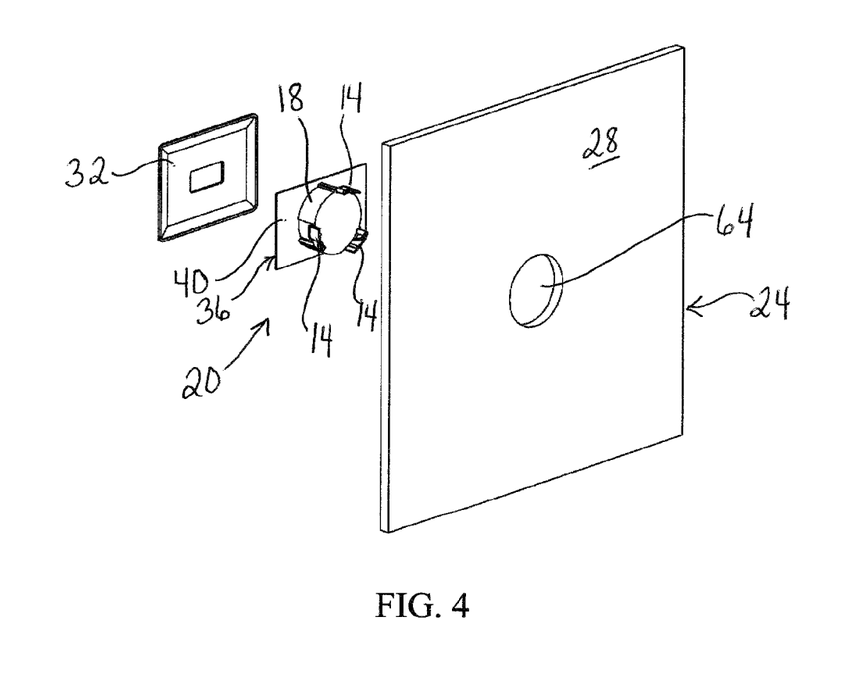
FIG. 4 illustrates a perspective view of the particular implementation of the recessed thermostat assembly in FIG. 3 showing braces in a retracted position.
Figure 5:
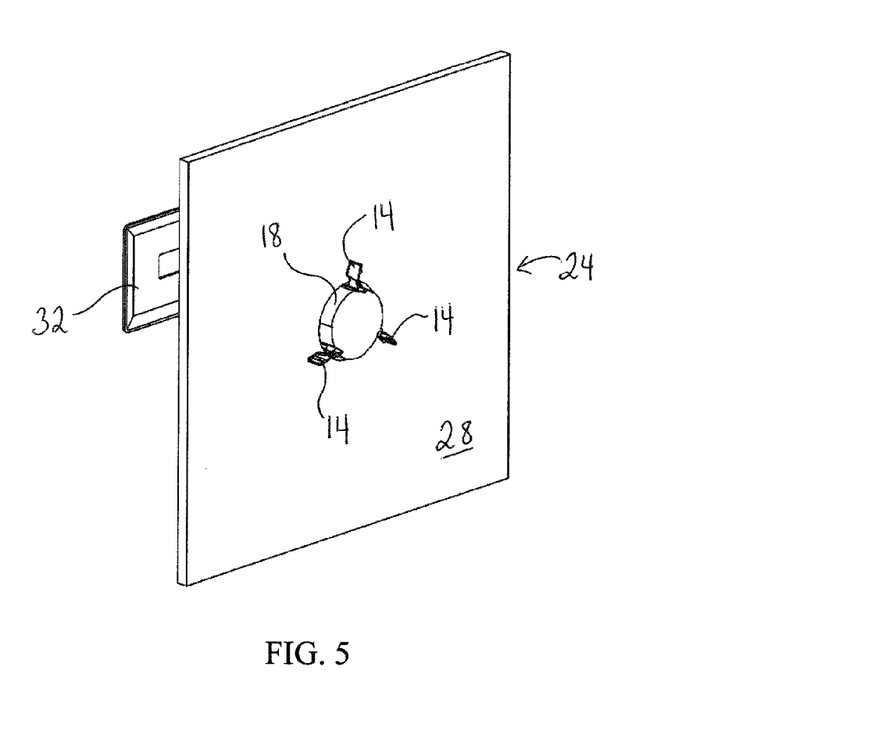
FIG. 5 illustrates a perspective view of the particular implementation of the recessed thermostat assembly in FIG. 3 showing braces in an engaged position.

FIGS. 3-5 illustrate another particular implementation of a thermostat assembly where at least one moveable brace 14 is responsively coupled to a brace actuator 16. In its installation position, each moveable brace 14 is adjacent the side wall 18 so that it does not extend outward much from the side wall 18 and the housing 20 including the moveable braces 14 can fit into the mounting hole 64. For the particular implementation shown in FIGS. 3-5, movement of the brace actuator 16 in a first direction 22 responsively causes the moveable brace 14 to move toward the face plate 6, and movement of the brace actuator 16 in a second direction 23 responsively causes the moveable brace 14 to move away from the face plate 6. In some particular implementations, such as the non-limiting example illustrated by FIGS. 3-5, a brace actuator 16 may be configured for rotational movement to pivot the moveable brace 14 from its installation position shown in FIG. 4, to its installation position shown in FIGS. 3 and 5. Once the moveable braces 14 are pivoted to their installation positions where they extend from the side wall 18 of the housing 20, continued rotation of the brace actuator 16 causes the moveable brace 14 to move linearly toward a face plate 36. In such particular implementations, like that illustrated in FIG. 3, the brace actuator 16 may comprise a screw 16 or other threaded and/or rotational engagement assembly. In other particular implementations, the brace actuator may be configured for linear movement in order to move a moveable brace linearly toward a face plate 36. For example, when the installer pulls linearly on the brace actuator, the brace may be configured to responsively move toward the face plate 6. In such particular implementations, the brace actuator 16 may comprise a pull cord having a serrated edge that engages a corresponding one-way latching feature coupled to the face plate 36 so that when the brace actuator is moved in a first linear direction, the serrated edge engages with the one way locking feature so that the moveable brace positioned on a back side 28 of the wall is resisted from moving in a second direction (i.e. away from the face plate 36).

It will be understood that a movable brace 14 is configured to impinge or clamp a building wall structure 24 between the movable braces 14 and a rear surface 40 of the face plate 36 when the moveable brace 14 is moved toward the face plate 36. With a wall structure 24 clamped between a moveable brace 14 and a rear surface 40 of a face place (shown in FIGS. 3 and 4), a thermostat assembly is recessedly mounted within a wall structure 24.

In particular implementations of a recessed thermostat assembly, when the thermostat assembly is mounted within the wall, whether through or on a surface so that the assembly extends into the wall structure 24, a face plate of the assembly may extend less than 1.5 centimeters from a front surface 26 of the wall 24. In other particular implementations, a face plate 6 is configured to be substantially flush with a front surface 26 of a wall structure 24 (as illustrated by FIG. 2).

For implementations where a brace actuator is used, such as that shown in FIGS. 3-5, the brace actuator 16 may be accessible through the face plate 36 via one or more openings in the face plate 36. Depending upon the particular implementation, the one or more openings may include, by way of non-limiting example, one or more screw apertures, one or more pull cord ports, and/or any other opening configured to allow access for the one or more brace actuators 16 to the one or more braces 14 behind the face plate 36. A removable cover plate 32 configured to removably and/or attachably couple to the face plate 36 to give the thermostat assembly a finished look and in the particular implementations of FIGS. 3-6 to cover brace actuators 16. It will be understood that a user may wish to cover the recessed thermostat assembly for aesthetic and/or practical considerations.

In other particular implementations, the face plate 36 may be separate from the one or more side walls 18 and the one or more side walls 18 may comprise one or more outwardly extending lips in place of the face plate 36 to prevent the housing from falling through the mounting hole 64 into the wall. Each outwardly extending lip could also be referred to as a face plate, albeit a smaller face plate, as it serves the function of resisting the housing from falling through the mounting hole 64. The housing, therefore, would comprise only the at least one side wall 18, outwardly extending lips braces 14 and brace actuators 16 operating as explained with reference to FIGS. 3-5, and/or with adhesive pads 46 as explained with reference to FIGS. 1-2. The housing, whether round or square or rectangle or other shape, may therefore be installed prior to the thermostat components. The thermostat components may then be installed into the housing thereafter and coupled thereto by corresponding brackets or clips within the housing and on the thermostat components, and then finished off with a cover plate 32 configured for the particular thermostat components. In particular implementations, a retrofit kit may comprise the housing configured to receive an existing ("old") thermostat unit so that when the installer places the housing in the wall, the installer can then simply couple the existing thermostat unit to the housing and finish the unit with a cover plate configured for the existing thermostat unit. In implementations where no specific face plate 36 is included, necessary components from the face plate (like the rear side 40 and the portions to which the cover plate 32 couples, may be integrated into the outwardly extending lips at appropriate places. Those of ordinary skill in the art will understand how to apply these principles and components given the present disclosure.

Figure 6:
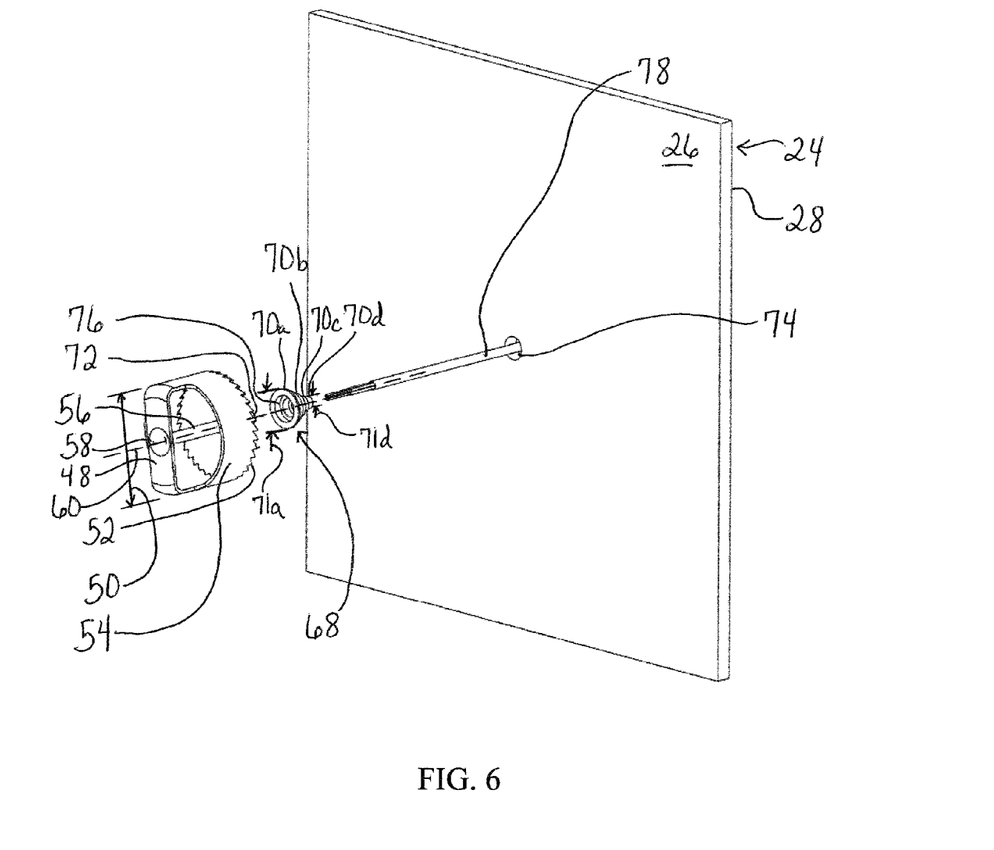
FIG. 6 illustrates an exploded view of a particular implementation of a cutting tool assembly.
Figure 7:
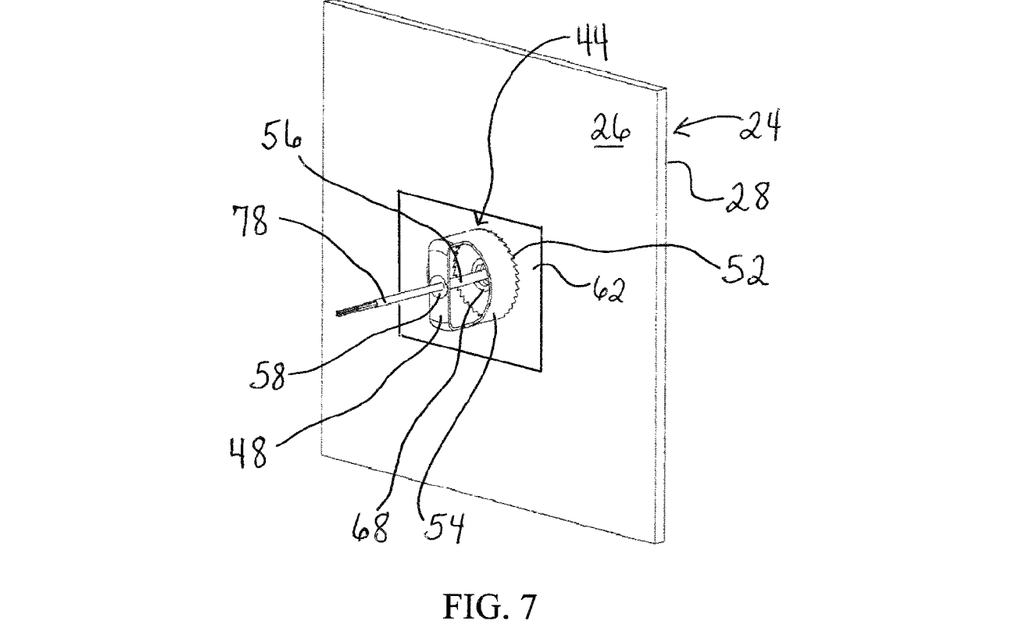
FIG. 7 illustrates an in-use view of a particular implementation of the cutting tool assembly of FIG. 6.
Figure 8:
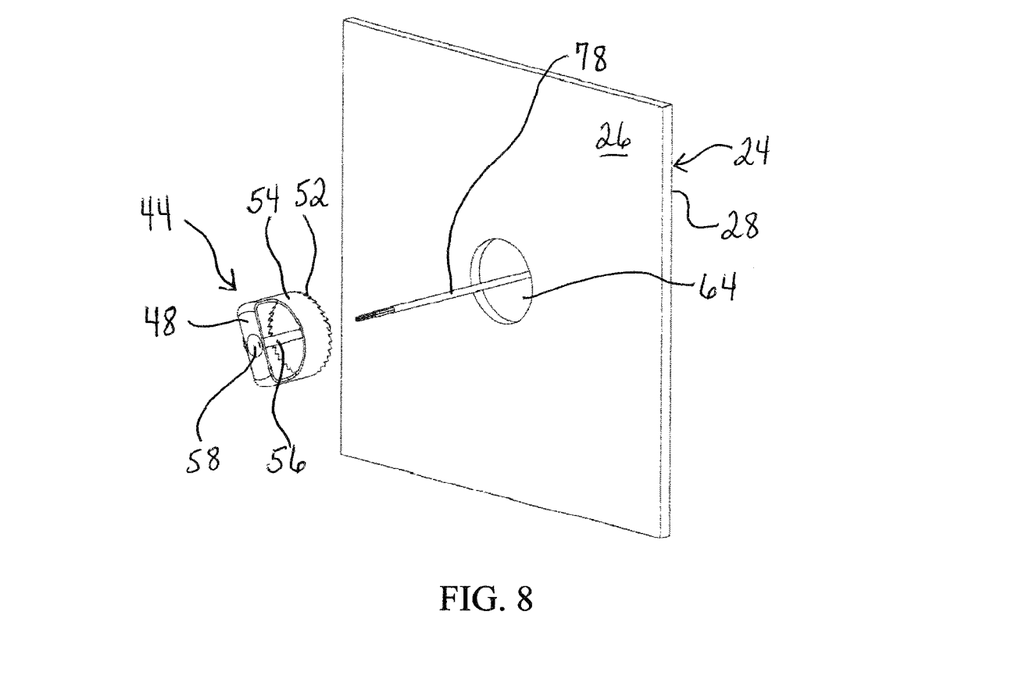
FIG. 8 illustrates a perspective view of particular implementation of the cutting tool of FIG. 6 after the mounting opening is cut.

FIGS. 6-8 illustrate a particular implementation of a recessed device cutting tool assembly 44 which may be included with some particular implementations of a recessed thermostat assembly. The recessed device cutting tool assembly is configured for manually cutting a mounting hole 64 (FIG. 8) in a building wall structure 24. When configured for use with a retrofit recessed thermostat device, such as those implementations illustrated in FIGS. 1-5, the mounting hole 64 would be sized to receive one or more side walls 12 or 18, but not a face plate 6 or 36 of a thermostat housing (since the face plate 6 and 36 is designed to be wider than the combined one or more side walls 12 and 18 to keep the respective face plates 6 and 36 from passing into the mounting hole 64).

In such particular implementations, a device mounting hole cutting tool assembly 44 includes a manual gripping handle 48 removably or integrally coupled across a diameter 50 of a cylindrically arranged plurality of cutting blades 52 arranged at an end of a cylindrical body 54. A shaft 56 extends along a center axis 60 of the cylindrically-arranged plurality of cutting blades 52 (from within the plurality of cutting blades 52) to a point beyond a front plane 62 (FIG. 7) of the plurality of cutting blades 52. The plurality of cutting blades 52 face in a direction perpendicular to the axis of rotation 60. In some particular implementations, such as the particular implementations illustrated in FIGS. 5-7, the shaft 56 is at least partially hollow along its center axis and the hollow 58 is sized to receive one or more wires 78 therethrough and retain those wires while a mounting hole 64 is cut in the wall structure 24 (see FIG. 7). In other particular implementations, the shaft 56 does not include a hollow. It will be understood that the plurality of cutting blades 52 are configured to cut a mounting hole 64 in a wall structure 24 when the one or more cutting blades 52 are engaged with the wall structure 24 (e.g.

such that the blades are in contact with a front surface 26 of the wall surface 24), and a manual rotational force by hand is applied in the direction of the cutting blades 52 and the wall structure 24.

Some particular implementations of a device mounting hole cutting tool assembly 44, such as the particular implementation illustrated by FIG. 6, the assembly 44 may include an additional guide 68 slidably mounted and/or coupled around the shaft 56 (in particular, a distal end 72 of the shaft 56). In such particular implementations, the guide 68 may include a plurality of cylindrical tiers 70a, 70b, 70c and 70d, with each cylindrical tier 70a, 70b, 70c and 70d having a different diameter 71a and 71d (for example). Alternatively, a conical guide may be used provided the guide includes a plurality of different diameters at various points along the guide narrowing toward the distal end of the guide. The diameters progress from a smallest diameter (71d) near a first guide end 70d closest a distal end 72 of the shaft 56 (with the shaft 56 inserted in the wire opening 76 of the guide 68), to a largest diameter 71a on a second guide end 70a farthest from the distal end 72 of the shaft 56 (with the shaft 56 inserted in the wire opening 76 of the guide 68). It will be noted that the guide 68 is sized for positioning within an existing hole 74 in the wall structure 24 at a center of the plurality of cutting blades 52. The different diameters of the guide 68 automatically allows the guide 68 to pass into the existing hole 74 to an amount where the diameter 71a, 71d matches most closely with, but is smaller than or equal to, the existing hole 74. Inclusion of a center guide to provide an anchor in which the shaft 56 can slidably engage and around which the cutting tool can manually rotate makes cutting the opening much easier than without a stable center axis. In other particular implementations, where the shaft 56 is not hollow, the wire 78 can enter the wire opening 76 of the guide 68 next to the shaft 56, but not extend up the center of the shaft 56. Alternatively, the wire can be pushed back into the wall through the initial hole 74 and then be fished back out after the mounting hole 64 is cut.

Still referring to FIGS. 6-8, in some particular implementations, the shaft 56 may be slidably coupled to the cylindrical body 54. While the particular implementations of cutting tool assembly illustrated by FIGS. 6-8 include a guide 68, it will be understood that other particular implementations of cutting tools and/or cutting tool assemblies may not include a guide.

Referring to FIGS. 1-8 collectively, a user desiring to install a recessed thermostat assembly in a wall structure 24 may place a recessed thermostat assembly to an installed position with respect to a mounting hole 64 in a wall structure 24. As shown best by FIGS. 2 and 3, the installed position includes a position where the face plate 6, 36 (in particular, a rear surface of a face plate 6, 36) is situated against a first side 26 of a wall structure 24, and with the at least one side wall 12, 18 extending into the wall structure 24. Adhesive pads 46 or other components may be used to couple the thermostat to the wall. Once a thermostat is moved to the installed position with respect to the wall 24, if the particular implementation includes brace actuators 16, a user may actuate a brace actuator 16 to responsively move a moveable brace 14 into an engaged position with respect to the wall structure 24 (FIG. 5). Moving a moveable brace to an engaged position may include rotating one or more brace actuators and/or braces and/or linearly moving one or more brace actuators and/or braces. When a user moves a moveable brace to an engaged position, at least a portion of the wall structure 24 is impinged or otherwise clamped between the movable brace and a rear surface of the face plate 36. Depending upon the particular implementation being installed, one or more movable braces 14 may be locked in place against the wall structure 24 (in the engaged position) after the wall 24 has been impinged. By way of non-limiting example, and depending upon the particular implementation, or more movable braces 14 may be locked in the engaged position by the mechanical cooperation of one or more screws with one or more screw apertures (and/or other anchor portions) and/or the mechanical cooperation of one or more serrated edges with one or more one way locking features.

In some particular implementations, such as where no previous hole (or only a small hole such as wiring hole 74, shown by FIG. 6) exists, a user may be required to cut a mounting hole 64 in a wall structure 24 prior to placing a thermostat assembly in the previously non-existent mounting hole 64. A user cutting a mounting hole 64 may thread one or more thermostat wires 78 (FIGS. 6-8) extending from a wire hole 74 in the wall structure 24 into a cutting tool assembly. In those particular implementations including a guide 68, a user may placing the cutting tool guide 68 in the wire hole 74 around the thermostat wires 78. In such particular implementations, threading one or more thermostat wires 78 into the cutting tool may first include threading the one or more thermostat wires through the guide 68.

Moreover, in such particular implementations, a user may place the cutting tool guide 68 in the wire hole 74 around the thermostat wires 78 such that the thermostat wires 78 extend through the guide 68. Since the guide 68 has a plurality of different diameters 71 such as on a cone, whether a gradual cone or cylindrical tiered cone (FIG. 6), a user may insert the guide 68 into the wire hole 74 so that the cylindrical tier 70a, 70b, 70c, or 70d or cone portion having a diameter 71 closest to, but less than or equal to, a diameter of the wire hole 74 is positioned within the wire hole 74.

A user may engage a front surface 26 of the wall structure 24 a plurality of cutting blades 52 (which are arranged in a circle around the cutting tool guide 68). With the cutting tool guide 68 at the center of the circle, a user may manually rotate the cutting tool about the center of the circle and manually apply pressure by hand ("manual pressure") against the handle 48 of the cutting tool to cut through a surface of the wall structure 24. To finish cutting the mounting hole 64, a user may continue applying manual rotation and pressure to the cutting tool It will be understood by those of ordinary skill in the art that the concepts of providing a recessed thermostat and cutting tool, as disclosed herein, is not limited to the specific implementations shown herein. For example, it is specifically contemplated that the components included in a particular implementation of a recessed thermostat and cutting tool may be formed of any of many different types of materials or combinations that can readily be formed into shaped objects and that are consistent with the intended operation of a recessed thermostat and cutting tool. For example, it is specifically contemplated that the components included in a particular implementation of a recessed thermostat and cutting tool may be formed of any of many different types of materials or combinations that can readily be formed into shaped objects and that are consistent with the intended operation of a recessed thermostat and cutting tool. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the particular recessed thermostat assemblies, thermostats, thermostat bodies, face plates, side walls, thermostat components, moveable braces, brace actuators, temperature sensors, thermostat displays, removable covers, openings, screws, pull cords, serrated edges, cutting tools, manual gripping handles, cutting blades, cylinders, shafts, center axes, front planes, mounting holes, cylindrical bodies, diameters, guides, cylindrical tiers, wire openings, wires, and other components forming a particular implementation of a recessed thermostat and cutting tool may be manufactured separately and then assembled together, or any or all of the components may be manufactured simultaneously and integrally joined with one another.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations of recessed thermostats and cutting tools are not limited to the specific components disclosed herein, as virtually any components consistent with the intended operation of a method and/or system implementation for a recessed thermostat and cutting tool may be utilized. Accordingly, for example, although particular recessed thermostat assemblies, thermostats, thermostat bodies, face plates, side walls, thermostat components, moveable braces, brace actuators, temperature sensors, thermostat displays, removable covers, openings, screws, pull cords, serrated edges, cutting tools, manual gripping handles, cutting blades, cylinders, shafts, center axes, front planes, mounting holes, cylindrical bodies, diameters, guides, cylindrical tiers, wire openings, wires, and other components are disclosed, such universal conduit bodies, first ports, conduits, plugs, cavities, open sides, panels, second ports, partial seals, hinge members, panel connectors, first port gaskets, second port gaskets, panel gaskets, setter screws, and other components may be disclosed, such components may comprise any shape, size, style, type, model, version, class, grade, measurement, concentration, material, weight, quantity, and/or the like consistent with the intended operation of a method and/or system implementation for a recessed thermostat and cutting tool may be used.

In places where the description above refers to particular implementations of a recessed thermostat and cutting tool, it should be readily apparent that a number of modifications may be made without departing from the spirit thereof and that these implementations may be applied to other recessed thermostats and cutting tools. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A recessed thermostat assembly, comprising:
   a thermostat housing comprising a face plate and a circular side wall extending from a rear surface of the face plate, the thermostat housing at least partially enclosing one or more thermostat components;
   a moveable brace responsive to a brace actuator, the brace actuator accessible through the face plate and operatively associated with the moveable brace such that movement of the brace actuator in a first direction responsively causes the moveable brace to move linearly toward the face plate and impinge a building wall structure between the moveable brace and the rear surface of the face plate when the circular side wall is mounted within a circular mounting hole opening on the building wall structure, and movement of the brace actuator in a second direction responsively causes the moveable brace to move away from the face plate; and
   a cutting tool for cutting the circular mounting hole opening in the building wall structure, the opening being sized to receive the circular side wall but not the face plate of the thermostat housing, the cutting tool including
      a manual gripping handle coupled across a diameter of a cylindrically arranged plurality of cutting blades; and
      a shaft extending along a center axis of the cylindrically arranged plurality of cutting blades, the shaft being partially hollow to receive wires when cutting the circular mounting hole opening.

2. The assembly of claim 1, wherein the face plate comprises one or more temperature sensors.

3. The assembly of claim 1, wherein after the moveable brace is moved to impinge the building wall structure, the face plate is configured to extend less than 1.5 centimeters from a front surface of the building wall structure.

4. The assembly of claim 1, wherein the face plate comprises a thermostat display.

5. The assembly of claim 1, wherein the brace actuator is configured for rotational movement to move the moveable brace linearly toward the face plate.

6. The assembly of claim 1, wherein the brace actuator is configured for linear movement to move the moveable brace linearly toward the face plate.

7. The assembly of claim 1, further comprising a removable cover plate configured to couple to a front surface of the face plate to cover an opening where the brace actuator is accessible through the face plate.

8. The assembly of claim 1, wherein the brace actuator comprises a screw.

9. The assembly of claim 1, the cutting tool further comprising
   the shaft extends from within the plurality of cutting blades to a point beyond a front plane of the plurality of cutting blades;
   wherein the plurality of cutting blades are configured to cut the circular mounting hole opening in the wall structure when the one or more cutting blades are engaged with the wall structure and a manual rotational force is applied in a direction of the cutting blades and the wall structure.

10. A method of installing a recessed thermostat assembly in a wall structure comprising:
   cutting a circular mounting hole through the wall structure with a cutting tool by manually rotating the cutting tool and manually applying pressure against the cutting tool;
   placing a thermostat assembly comprising at least one face plate and at least one side wall extending behind the face plate at an installed position with respect to the circular mounting hole in the wall structure, the installed position being where the face plate is against a first side of the wall structure and the at least one side wall extends into the wall structure;

actuating a brace actuator to linearly move a moveable brace into an engaged position with respect to the wall structure;

impinging at least a portion of the wall structure between the movable brace and a rear surface of the face plate;

coupling the thermostat assembly to the wall structure by locking the moveable brace in place against the wall structure after the wall structure is impinged;

threading thermostat wires extending from a wire hole in the wall structure into the cutting tool; and placing a cutting tool guide in the wire hole around the thermostat wires.

11. The method of claim 10, further comprising:

engaging a front surface of the wall structure with the cutting tool, the cutting tool comprising a plurality of cutting blades arranged in a circle around the cutting tool guide with the cutting tool guide at the center of the circle; and cutting the mounting hole through the wall structure with the cutting tool by continuing manual rotation and pressure.

12. The method of claim 11, wherein threading the thermostat wires into the cutting tool comprises threading the thermostat wires through the guide.

13. The method of claim 11, wherein placing the cutting tool guide in the wire hole around the thermostat wires further comprises positioning the guide within the hole with the thermostat wires extending through the guide, the guide comprising a plurality of different diameters, wherein the guide is inserted into the wire hole so that a guide portion having a diameter closest to but not greater than a diameter of the hole is positioned within the wire hole.

14. The method of claim 10, further comprising coupling a thermostat unit into an opening of the thermostat assembly and covering at least a portion of the thermostat unit with a cover plate that covers the opening to the thermostat assembly except for the portion of the thermostat unit.

15. A method of installing a recessed thermostat assembly in a wall structure comprising:

cutting a circular mounting hole through the wall structure with a cutting tool by manually rotating the cutting tool and manually applying pressure against the cutting tool;

placing a thermostat assembly comprising at least one face plate and at least one side wall extending behind the face plate at an installed position with respect to the circular mounting hole in the wall structure, the installed position being where the face plate is against a first side of the wall structure and the at least one side wall extends into the wall structure;

actuating a brace actuator to move a moveable brace into an engaged position with respect to the wall structure;

impinging at least a portion of the wall structure between the movable brace and a rear surface of the face plate;

coupling the thermostat assembly to the wall structure by locking the moveable brace in place against the wall structure after the wall structure is impinged;

threading thermostat wires extending from a wire hole in the wall structure into the cutting tool;

placing a cutting tool guide in the wire hole around the thermostat wires;

engaging a front surface of the wall structure with the cutting tool, the cutting tool comprising a plurality of cutting blades arranged in a circle around the cutting tool guide with the cutting tool guide at the center of the circle; and cutting the mounting hole through the wall structure with the cutting tool by continuing manual rotation and pressure.

16. The method of claim 15, wherein threading the thermostat wires into the cutting tool comprises threading the thermostat wires through the guide.

17. The method of claim 15, wherein placing the cutting tool guide in the wire hole around the thermostat wires further comprises positioning the guide within the hole with the thermostat wires extending through the guide, the guide comprising a plurality of different diameters, wherein the guide is inserted into the wire hole so that a guide portion having a diameter closest to but not greater than a diameter of the hole is positioned within the wire hole.

* * * * *